US012737872B2

(12) United States Patent
Schüller et al.

(10) Patent No.: US 12,737,872 B2
(45) Date of Patent: Sep. 15, 2026

(54) COMPUTER-IMPLEMENTED METHOD FOR MEASURING AN OBJECT

(71) Applicant: Volume Graphics GmbH, Heidelberg (DE)

(72) Inventors: Sören Schüller, Heidelberg (DE); Thomas Günther, Heidelberg (DE); Daniela Handl, Heidelberg (DE); Matthias Flessner, Heidelberg (DE); Christof Reinhart, Heidelberg (DE); Christoph Poliwoda, Heidelberg (DE); Sven Gondrom-Linke, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 479 days.

(21) Appl. No.: 17/924,092

(22) PCT Filed: Apr. 28, 2021

(86) PCT No.: PCT/EP2021/061100
§ 371 (c)(1),
(2) Date: Nov. 8, 2022

(87) PCT Pub. No.: WO2021/228551
PCT Pub. Date: Nov. 18, 2021

(65) Prior Publication Data

US 2023/0196546 A1 Jun. 22, 2023

(30) Foreign Application Priority Data

May 11, 2020 (DE) ..................... 10 2020 112 650.6

(51) Int. Cl.
*G06T 7/00* (2017.01)
*G06T 7/60* (2017.01)
*G06V 10/25* (2022.01)

(52) U.S. Cl.
CPC .............. *G06T 7/0006* (2013.01); *G06T 7/60* (2013.01); *G06V 10/25* (2022.01); *G06T 2207/10116* (2013.01); *G06T 2207/30164* (2013.01)

(58) Field of Classification Search
CPC ..................... G06T 7/0006; G06T 7/60; G06T 2207/10116; G06T 2207/30164; G06V 10/25
See application file for complete search history.

(56) References Cited

U.S. PATENT DOCUMENTS

2014/0368500 A1 12/2014 O'Hare et al.
2019/0137421 A1 5/2019 Ferro et al.

FOREIGN PATENT DOCUMENTS

CN 110832543 A 2/2020
DE 202011110199 U1 4/2013
(Continued)

OTHER PUBLICATIONS

Kruth JP et al: "Computed tomography for dimensional metrology", CIRP Annals, vol. 60, No. 2, pp. 821-842, XP28262022, ISSN: 0007-8506, DOI:10.1016/J.CIRP.2011.05.006 (Year: 2011).*
(Continued)

*Primary Examiner* — Vu Le
*Assistant Examiner* — Matthew James Bodnark
(74) *Attorney, Agent, or Firm* — SoCal IP Law Group LLP; Angelo J. Gaz

(57) ABSTRACT

Described is measuring an object by: determining measurement data using a device for measuring the object, wherein the measurement data generates a digital representation of the object with image data; and before the determining measurement data has ended: analyzing part of the digital representation to identify defects; if a defect is identified: determining at least one conformity result relating to the
(Continued)

analyzed part, the conformity result indicating to what extent the analyzed part with the determined defect fulfils at least one predefined conformity criterion for the object; and if no defect is identified and sufficient measurement data have been acquired to determine that the analyzed part fulfils the at least one conformity criterion: generating a conformity result relating to the analyzed part, the conformity result indicating that the at least one predefined conformity criterion is fulfilled for the object; adapting the step of determining, taking the conformity result into account.

14 Claims, 1 Drawing Sheet

(56) References Cited

FOREIGN PATENT DOCUMENTS

| | | | |
|---|---|---|---|
| DE | 102017208811 | A1 | 11/2018 |
| JP | 2006208186 | A | 8/2006 |
| WO | 2021228551 | A1 | 11/2021 |

OTHER PUBLICATIONS

Villarraga-Gomez Herminso et al: "Dimensional metrology with X-ray CT: A comparison with CMM measurements on internal features and compliant structures", Precision Engineering, Elsevier, Amsterdam, NL, vol. 51, Aug. 30, 2017, pp. 291-307 (Year: 2017).*

Kruth J P et al, "Computed tomography for dimensional metrology", Jun. 3, 2011 (Jun. 3, 2011), vol. 60, No. 2, p. 821-842.

Villarraga-Gómez Herminso et al, "Dimensional metrology with X-ray CT: A comparison with CMM measurements on internal features and compliant structures", Precision Engineering, Elsevier, Amsterdam, NL, vol. 51, Aug. 30, 2017 (Aug. 30, 2017), p. 291-307.

German Patent Office, Examination Report for German Patent Application No. 10 2020 112 650.6, mail date Jan. 14, 2021.

European Patent Office, International Search Report and Written Opinion for PCT Application No. PCT/EP2021/061100, mail date Aug. 13, 2021.

Chinese Patent Office, First Examination Opinion Notice for Application No. 202180048819.3 mail date Dec. 23, 2025.

Chinese Patent Office, Search Report for Application No. 202180048819.3 mail date Dec. 23, 2025.

* cited by examiner

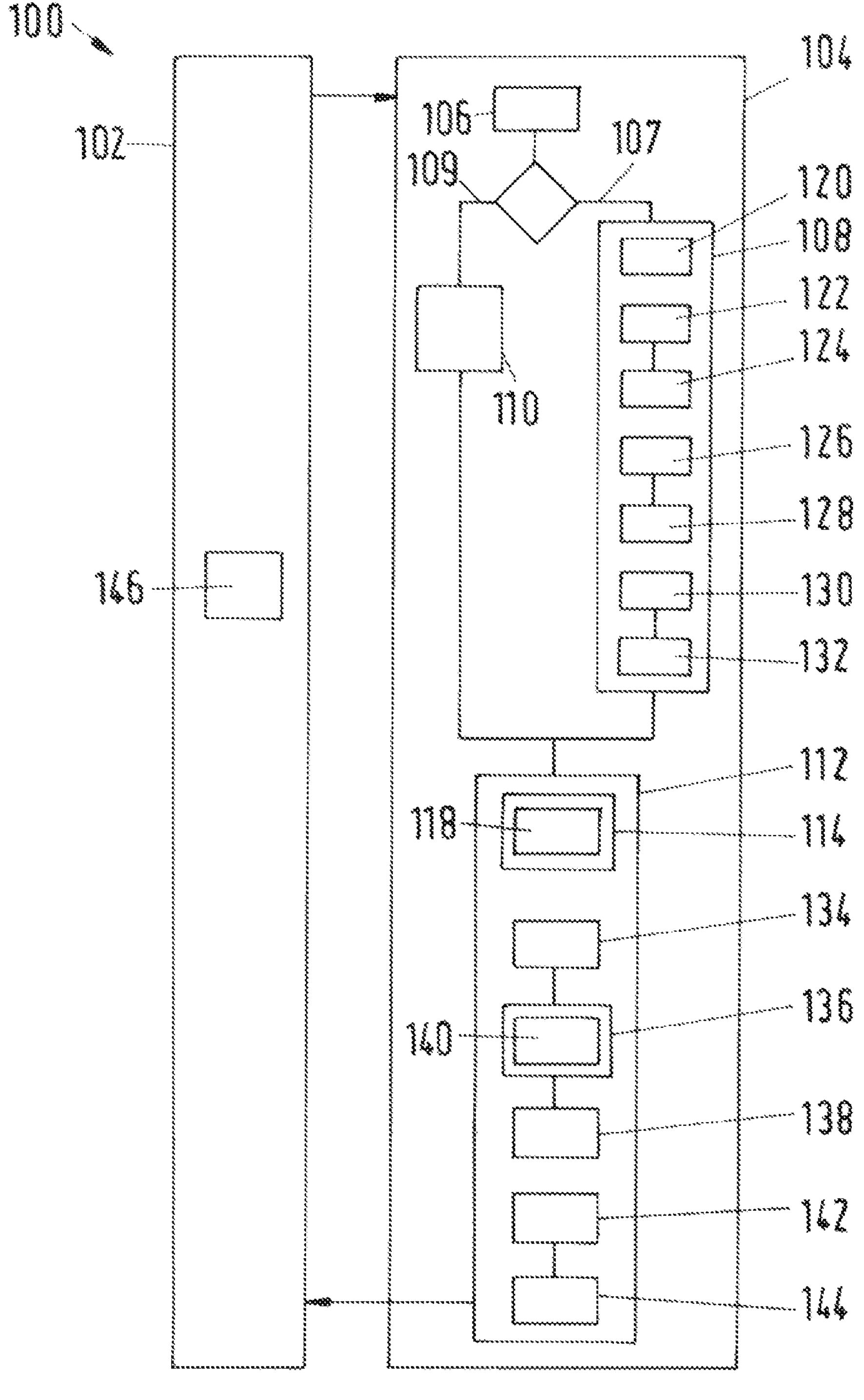
100
102
104
106
107
109
120
108
122
124
110
126
128
146
130
132
112
118
114
134
140
136
138
142
144

COMPUTER-IMPLEMENTED METHOD FOR MEASURING AN OBJECT

RELATED APPLICATION INFORMATION

This patent claims priority from International PCT Patent Application No.PCT/EP2021/061100, filed Apr. 28, 2021, entitled, "COMPUTER-IMPLEMENTED METHOD FOR MEASURING AN OBJECT", which claims priority to German Patent Application No. 10 2020 112 650.6, filed May 11, 2020, all of which are incorporated herein by reference in their entirety.

The invention relates to a computer-implemented method for measuring an object.

In the mass production of components, the individual components are subject to manufacturing tolerances and possible defects. To check whether the tolerances are observed and whether defects are present in the component, measurements are carried out on the components. A component to be measured is initially unknown at the time of measurement. This can apply to the entire geometry of the component or just parts of the geometry of the component. Even with a known target geometry, the component to be measured will have unknown deviations from this, and these deviations often need to be checked.

It is known to define how the entire determination of the measurement data will be performed before the measurement is started. However, repeated measurements may be necessary if regions of the component that are required to determine the geometry of the component have not been acquired with sufficiently high quality during the initial measurement.

The object of the invention is therefore to provide a computer-implemented method which has an increased efficiency.

The main features of the invention are specified herein.

In a first aspect, the invention relates to a computer-implemented method for measuring an object, the method comprising the following steps: determining measurement data by means of a device for measuring the object, wherein the measurement data generates a digital representation of the object with a plurality of image data of the object; and carrying out the following steps at least before the step of determining measurement data has ended: analyzing at least one part of the digital representation of the object to identify defects; if at least one defect is identified in the analyzed at least one part of the digital representation: determining at least one conformity result relating to the at least one analyzed part of the digital representation of the object, the conformity result indicating to what extent the analyzed at least one part of the digital representation with the identified at least one defect fulfils at least one predefined conformity criterion for the object; and if no defect is identified in the analyzed part of the digital representation and sufficient measurement data have been acquired to determine that the analyzed at least one part of the digital representation of the object fulfils the at least one conformity criterion: generating a conformity result relating to the at least one analyzed part of the digital representation of the object, the conformity result indicating that the at least one predefined conformity criterion is fulfilled for the object; adapting the step of determining measurement data taking the at least one conformity result into account.

The invention provides a computer-implemented method for measuring an object which, during the determination of the measurement data, uses information resulting from the determination of the measurement data to affect the determination of the measurement data after a preliminary analysis. In order to minimize the average image acquisition time, properties to be measured that will most likely not be within tolerance tend to be acquired in the measurement data and evaluated during the preliminary evaluation. In this way, a possible termination of the measurement procedure takes place earlier on average. The information about which properties to be measured these are can come, for example, from a statistical evaluation of measurements of similar objects. For serial measurements, the sequence of the measurement procedure can thus be continuously adjusted or optimized.

Furthermore, if measurements are taken with a greater geometric magnification, in the example of a radiographic measurement with X-rays e.g. an X-ray spot close to the object to be measured, preliminary information about the geometry of the object, e.g. from CAD and/or existing measurement data, can be used to prevent the object from colliding with an X-ray tube or detector.

In one example, the measurement can be a radiographic measurement, e.g. using X-ray radiation. In another example, the measurement can be an optical measurement, e.g. photogrammetry, strip projection, or the examination of an object or its surface with a camera, or can involve measurements of the interior of an object using ultrasound, or another type of measurements.

In a radiographic measurement, the analysis can be performed on the basis of 2D radiographic images, a reconstructed 3D volume, or both in combination.

The digital representation of the object can be a volumetric representation, a sectional representation, a projection representation and/or a surface representation. The volume representation can be derived e.g. from a plurality of projection representations. The surface representation can be derived e.g. from a volumetric representation or, in the case of photogrammetry and strip projection, from a plurality of camera images or measurement images.

The radiographic measurement is carried out by means of a device that determines measurement data from a radiographic geometry around the object. The object is irradiated from different radiation directions. A radiographic geometry describes the direction in which the object is irradiated, but also the position of the irradiated region and the magnification. Quite generally, the radiographic geometry can be described by the position of the X-ray source and the detector, viewed relative to the measurement object. This results in nine geometric degrees of freedom: three degrees of freedom each for the tube and the detector for the translation and three degrees of freedom for the detector for the rotation. A radiographic geometry can be defined with respect to the measurement object, but also with respect to the device for measuring the object.

The conformity result may exhibit an uncertainty, e.g. at the beginning of the determination of the measurement data, if, taking the radiographic measurement example, only a few projections have yet been recorded.

Analyzing at least one part of the digital representation of the object to identify defects can be understood to mean e.g. a reconstruction, segmentation and/or surface determination of the measurement data, which can be followed by a further analysis. In doing so, e.g. a defect analysis, in particular for pores, voids, inclusions, cracks, porosities or microstructure disaggregations, both in the interior of the object and/or on the surface, a dimensional analysis, in particular based on dimension, shape, position, ripple, roughness, wall thicknesses, target-actual comparison of defined geometries or in defined regions, and/or a material analysis, in particular a fiber composite analysis or a foam structure analysis, can be carried out. Alternatively or additionally, it is possible to perform a detection of the surface, a detection of the interior of the component, i.e. of the material, or an analysis for completeness in the case of assemblies, e.g. for a missing element.

Different approaches can be chosen to perform the analysis with regard to these properties, e.g. the evaluation of three-dimensional measurement data obtained from radiographic measurements of an object.

Alternatively or additionally, an evaluation of two-dimensional measurement data can be performed. This means that the radiographic measurements can also be analyzed directly without reconstruction. This can take place directly on unprocessed radiographic images. For this purpose, multiple radiographic images of different radiographic geometries can also be taken into account together.

Alternatively, a reference image can be used to be able to better identify any defects in the images, e.g. a differential image with respect to a radiographic comparison measurement of a previous measurement of a similar object, which can be averaged, or a differential image with respect to a simulation of an at least similar radiographic image of the target geometry. In addition to conventional algorithms for detecting defects in two-dimensional measurements, an artificial intelligence system can also be trained to identify the defects with high reliability. It may be advantageous to use local information from other sensors for the evaluation, in particular ultrasound for defect and other material analyses or optical and tactile sensors for dimensional metrology.

If the preliminary analysis of the measurement data already available is carried out, these can be examined, for example, in particular with regard to the question of whether the required quality of the measurement data has already been achieved, which may not necessarily be carried out globally, but also locally. This can be a global minimum quality of the measurement data specified for the entire measurement volume, or a local minimum quality of the measurement data defined according to the location or a property to be measured. The minimum quality can also be automatically checked on the basis of the measurement variables specified in an evaluation plan, including tolerances if necessary. The position of the current measurement result with respect to the tolerance interval is also determined. If an estimate of the measurement uncertainty, e.g. on the basis of the current quality of the measurement data, but also on the basis of empirical values, is additionally taken into account, it is possible to determine whether the quantity is safely within or outside the tolerance interval. This would allow a reliable conclusion about the required quality of the measurement data. If this conclusion cannot be drawn, further information in this region will be necessary. If no minimum quality of the measurement data has been defined, either explicitly or implicitly via measurement tasks, the quality of the measurement data can still be analyzed to identify those regions in which the quality of the measurement data is the lowest.

This information can be used to decide whether a further measurement run is still necessary or whether the available information is sufficient to process the defined measurement task. If further information is required, optimized exposure parameters can be determined for the subsequent radiographic images.

A tolerance range that is relevant to the decision about the conformity of the component can be specified. The measurements to be performed are often defined in an evaluation plan.

A conformity criterion can be, for example, a specified tolerance that will be checked.

The part of the digital representation of the object is formed from the measurement data determined so far.

Adapting the step of determining measurement data, taking at least one conformity result into account, may result in optimized imaging parameters. Imaging parameters of a projection can be the radiographic geometry of the projection, and/or setting options that can be set when an object is imaged, such as current, voltage and pre-filtering of the tube, the exposure time, the gain factor, the tube used, e.g. micro- or nanofocus tube, the target used, e.g. reflection or transmission target, the detector used, e.g. area or line detector, or a possible binning of the detector. If energy-selective detectors are used, the choice of the energy bins can be a setting option.

The decision whether the measurement task can be processed on the basis of the available information and the determination of the measurement data can thus be terminated and/or whether or where further measurement data is required, can occur in various cases. In the case of a globally or locally defined minimum quality, the determination of the measurement data can be terminated if the quality has been achieved everywhere. In many cases, it is sufficient that a critical quantity of the dimensional measurement is outside the tolerance to treat a measured object as scrap. In these cases, the measurement data can be aborted if a critical quantity is definitely out of tolerance. The measurement results of the remaining variables are then usually no longer relevant to the decision.

For statistical monitoring of the manufacturing process, the determination of the measurement data can be continued despite the option to abort the determination of the measurement data. In this case, the measurement data can continue to be determined until the data has a maximum permitted uncertainty. The measurement data is then no longer used to judge the conformity of the object, but to regulate the manufacturing process.

In order to be able to reliably evaluate an object as good or conformant, i.e. with a positive conformity result, all critical quantities to be tested must normally be within tolerance. As soon as all these variables are reliably within tolerance, the determination of the measurement data can be aborted. More complex and/or combined decision rules are also conceivable in principle.

In many cases, it is therefore necessary to determine the, possibly local, quality of the measured data. In addition, a determination of the local uncertainty from the quality of the measurement data can be carried out, which can be expressed in terms of the determined measurement result and a tolerance, as well as the position of the determined measurement result within this tolerance. In the case of dimensional metrology, the local volume data can be analyzed to estimate a local uncertainty of the measurement, e.g. to estimate the position of the surface or geometry elements fitted to the surface. In defect analysis and other material analysis techniques, for example, the resolution of the data, e.g. based on the point spreading function, and the noise, e.g. the signal-to-noise ratio, can be used to determine the quality of the measurement data. From this it is possible to deduce whether details of a certain size, e.g. small structures, defects or fibers, can be detected with a certain degree of certainty or uncertainty given the present quality of the measurement data. From this, a so-called "contrast detail detectability" can be derived.

In another example of a radiographic measurement, the question may be whether, given the quality of the measurement data, the details of the defined size, which usually cause gray value fluctuations in the measurement data, can be reliably distinguished at all from the gray value fluctuations caused by noise and/or artifacts.

The quality of the measurement data can be further ascertained by analyzing the homogeneity of the data, e.g. to detect strip- or beam-hardening artifacts, as well as other methods.

Furthermore, empirical values can be used for different analyses to estimate the local quality of the measurement data and/or uncertainty. For this purpose, a certain quality of the measured data or uncertainty of the measurement data can be expected if this region has been acquired by a certain number of radiographic images. This can be derived e.g. from the specification of the CT system used.

In the case of a two-dimensional measurement or analysis, an uncertainty can be derived from, for example, imaging parameters such as the size of the X-ray spot or the resolution of the detector. Alternatively or in addition, parameters such as noise or contrast in the radiographic images can be analyzed.

The step of carrying out the following steps at least before the step of determining measurement data has ended, can be performed several times in succession with additional or other measurement data obtained by the step of determining measurement data.

According to one example the step of adapting the step of determining measurement data taking the conformity result into account can comprise the following sub-step: terminating the step of determining measurement data if the conformity result indicates that the analyzed at least one part of the digital representation with the at least one identified defect does not fulfil at least a part of the at least one conformity criterion.

This is the case, for example, if measurement variables of the defects that are outside the tolerance have been identified, in which case the component is not acceptable. In another example, this may be the case if all measurement variables have been verified to be within tolerance, in which case the component is acceptable. In some cases, this cannot be determined from individual measurement variables, e.g. if there are more complex decision criteria, i.e. conformity criteria, for the conformity result.

It may be provided that the fulfilment and/or non-fulfilment of the conformity criterion is only determined if the fulfilment and/or non-fulfilment is 100% reliable.

According to another example, the step of adapting the step of determining measurement data taking the conformity result into account can comprise the following sub-step: terminating the step of determining measurement data when sufficient measurement data have been acquired in order to determine that the analyzed at least one part of the digital representation of the object fulfils the at least one conformity criterion.

This can be carried out, for example, in two stages. Based on the quality of the measurement data, it is estimated that there can be no completely undetected defects present in the object. For example, if defects are detected, the measurement variable currently being measured and the associated uncertainty are identified and used to deduce whether the defect could be problematic with regard to tolerance.

In another example, the step of terminating the of determining measurement data can comprise the following sub-step: taking into account at least one uncertainty of the step of analyzing at least one part of the digital representation of the object for identifying defects.

In the case of a three-dimensional digital representation, the noise or the point spreading function can be taken into account to estimate whether a defect outside the tolerance has been reliably identified based on the available data. In the case of two-dimensional digital imaging of radiographic measurements, the contrast and the noise in radiographic images can be used. The uncertainty can relate to whether a defect is discovered or to what extent the geometry, e.g. diameter or volume, of an identified defect has been correctly detected.

For example, the step of determining a conformity result may comprise the following additional sub-step: determining at least one local uncertainty of the step of analyzing at least one part of the digital representation of the object for identifying defects for one part of the digital representation of the object that comprises the analyzed at least one defect, the local uncertainty being estimated by means of a local noise of the measurement data and/or the local image information in a surrounding region around already known further defects.

In this case, the uncertainty of the measurements is determined based e.g. on local measurements or minimum quality requirements for the measured data specified by an evaluation plan.

In another example the step of determining at least one conformity result relating to the at least one analyzed part of the digital representation of the object can comprise the following sub-steps: determining whether a global quality requirement for the measurement data of the at least one part of the digital representation of the object is fulfilled, wherein the global quality requirement for the entire digital representation of the object is derived from an evaluation rule, and if the global quality requirement is not fulfilled: providing at least one conformity result indicating that it is uncertain whether the at least one part of the digital representation fulfils the predefined conformity criterion.

An evaluation rule can be used here, e.g. to specify minimum requirements on noise and a point spreading function. If these are fulfilled, possibly for the entire measurement, the uncertainty is considered e.g. small or negligible in relation to the required tolerance and/or it is concluded that no problematic defects can be overlooked.

According to another example, the step of determining at least one conformity result relating to the at least one analyzed part of the digital representation of the object can comprise the following sub-steps: determining whether a local quality requirement for the measurement data of the at least one part of the digital representation of the object is fulfilled, wherein the at least one local quality requirement for a region of the digital representation of the object is derived from an evaluation rule, and if the local quality requirement is not fulfilled: providing at least one conformity result indicating that it is uncertain whether the at least one part of the digital representation fulfils the predefined conformity criterion.

The evaluation rule specifies, e.g. local minimum requirements for noise and point spreading function, which may depend on the analyses to be performed locally. If these are fulfilled, the uncertainty is considered e.g. small or negligible in relation to the required tolerance. The uncertainty is determined locally and estimated with the aid of the local noise and the available two- or three-dimensional image data of the individual spatial regions and already identified defects or their surroundings.

In another example, the step of determining at least one conformity result may comprise the following additional sub-step: providing a point spreading function derived from the measurement data; and estimating a confidence value to indicate to what extent a defect that does not fulfil the predefined conformity criterion for the object can be identified, taking into account the quality of the measurement data.

The point spreading function, which was determined from the measurement data, is also used in this process to estimate whether defects outside the tolerance can be reliably identified on the basis of the quality of the measurement data.

In the step of determining measurement data, for example by means of a device for measuring the object, a radiographic measurement of the object can be carried out, wherein the step of adapting the step of determining measurement data taking the conformity result into account has the following sub-step: identifying at least one region in the at least one part of the digital representation of the object, in which the at least one conformity result indicates that it is uncertain whether the at least one predefined conformity criterion is fulfilled or not; modifying a radiographic geometry of the radiographic measurement of the object in the step of determining measurement data, in such a way that further measurement data is determined for the identified region.

In this example, the measurement variables/regions are identified for which no reliable statements are yet possible using the conformity result. Measurement data with the respective radiation geometry are included in greater amounts or selectively, which allow a more accurate conclusion for these measurement variables. The measurement data can also include projections that represent the relevant region with higher geometrical magnification, i.e. the at least one region in the at least one part of the digital representation of the object, in which the at least one conformity result indicates that it is uncertain whether the at least one predefined conformity criterion is fulfilled or not. For example, this can be carried out such that the corresponding regions in the projections to be imaged are displayed more frequently and/or at a higher geometric magnification.

In another example, the step of adapting the step of determining measurement data taking the conformity result into account can further comprise the following sub-step: changing at least one setting option of a device for carrying out the step of determining measurement data, taking the modified radiographic geometry into account.

In this case, imaging parameters and/or setting options are optimized, in particular voltage, current and/or exposure time, to achieve an ideal data quality for the radiographic geometry.

According to a further example the sub-step of modifying a radiographic geometry of the radiographic measurement of the object in the step of determining measurement data has the following sub-substep: modifying the radiographic geometry of the radiographic measurement of the object, avoiding simultaneous radiographic measurement of predefined and/or strongly absorbing regions of the object and of the identified regions of the object identified from the measurement data, in which the conformity result indicates that no conclusion can be drawn as to whether the analyzed at least one part of the digital representation of the object with the identified defect fulfils or does not fulfil the at least one predefined conformity criterion.

This avoids the regions of the measurement variables being obscured by strongly absorbing regions.

It can also be provided that the step of adapting the step of determining measurement data taking the conformity result into account can comprise the following sub-step: identifying at least one region in the at least one part of the digital representation of the object, in which the at least one conformity result indicates that it is uncertain whether the at least one predefined conformity criterion is fulfilled or not; determining measurement data of a further measurement, which differs from the radiographic measurement, from the identified region in such a way that further measurement data is determined for the identified region.

In this example, the measurement variables or regions for which no reliable conclusions about conformity are yet possible are identified. The further measurement can be carried out e.g. by means of an ultrasonic sensor.

Furthermore, the step of carrying out the steps: analyzing at least one part of the digital representation of the object to identify defects; if at least one defect is identified in the analyzed at least one part of the digital representation: determining at least one conformity result relating to the at least one analyzed part of the digital representation of the object, the conformity result indicating to what extent the analyzed at least one part of the digital representation with the identified at least one defect fulfils at least one predefined conformity criterion for the object; and if no defect is identified in the analyzed part of the digital representation and sufficient measurement data have been acquired to determine that the analyzed at least one part of the digital representation of the object fulfils the at least one conformity criterion: generating a conformity result relating to the at least one analyzed part of the digital representation of the object, the conformity result indicating that the at least one predefined conformity criterion is fulfilled for the object; adapting the step of determining measurement data taking the at least one conformity result into account; can be carried out while the step of determining measurement data is carried out.

While the preliminary measurement data is still being analyzed, the determination of measurement data is continued. It takes a comparatively long time to carry out the evaluations and to identify optimized imaging parameters or to take a decision as to whether further radiographic images are necessary at all. In the meantime, no updated or optimized imaging parameters are therefore available. Instead of waiting for these calculations to be completed before acquiring further radiographic images, additional images can be acquired during the evaluation. For example, in the time taken for the calculations, ten to twenty additional images can be acquired. However, since there are no optimized acquisition parameters available yet, for example, imaging parameters can be selected that still originate from the last iteration and have a lower optimization than the imaging parameters that will be available after the calculation is complete.

In another example, the step of determining measurement data can also comprise the following step: generating a digital representation of the object only for those parts of the object in which the at least one predefined conformity criterion is defined.

Thus, only the conformity-relevant regions of the object are used for generating the digital representation of the object. The remaining regions of the object are not represented digitally. This reduces the amount of data for evaluation. Since the simultaneous evaluation of measurement data places great demands on computing power, the reduction of the amount of data to be evaluated is particularly advantageous, since the required computing power is thereby reduced. For this step, a pre-alignment of the measurement data can be carried out, i.e. the measurement data can be provisionally aligned to a target geometry of the object. This can be carried out e.g. on the basis of a one-off, rapid reconstruction. Only those regions in which no reliable conclusion about conformity has yet been possible are reconstructed. Alternatively, or in addition, the entire volume or larger regions can be reconstructed with low resolution and only those regions where the low resolution does not allow for a clear conclusion can be reconstructed in full resolution.

If the type of object in the device for measuring the object is known, the spatial orientation, i.e. the alignment, of the measurement data or the object may be initially unknown. This is relevant, however, in order to be able to start any previously defined radiographic geometries, for example trajectories. For this purpose, the spatial orientation of the object in the device for measuring the object can be determined on the basis of the initial radiographic images and the subsequent radiographic geometries can be started up accordingly.

A further aspect of the invention relates to a computer program product having instructions executable on a computer, which when executed on a computer cause the computer to carry out the method in the preceding description.

Advantages and effects as well as further developments of the computer program product arise from the advantages and effects as well as further developments of the above described method. In this respect, reference is therefore made to the preceding description. For example, a computer program product can mean a data carrier on which a computer program element is stored, that contains instructions that can be executed for a computer. Alternatively, or in addition, a computer program product can also mean, for example, a permanent or volatile data store, such as flash memory or RAM, that contains the computer program element. However, other types of data stores that contain the computer program element are not excluded.

Further features, details and advantages of the invention emerge from the wording of the following description of exemplary embodiments on the basis of the drawings. In the drawings:

FIG. 1 shows a flow diagram of the computer-implemented method.

The computer-implemented method for measuring an object is referenced below in its entirety with the reference sign 100 as specified in FIG. 1.

In a first step 102, the method 100 comprises determining measurement data by means of a device for measuring the object. The measurement data generates a digital representation of the object, which comprises a plurality of image data of the object. This can be e.g. a two-dimensional representation of the object or a three-dimensional representation of the object. The digital representation of the object can also be derived from the measurement data, e.g. in radiographic measurements by means of tomographic reconstruction.

In an optional sub-step 146 of step 102 a digital representation of the object can be generated only for those parts of the object in which the at least one predefined conformity criterion is defined. Thus, only the conformity-relevant regions of the object are used for generating the digital representation of the object. The remaining regions of the object are not represented digitally. This reduces the amount of data for evaluation. Since the simultaneous evaluation of measurement data places great demands on computing power, the reduction of the amount of data to be evaluated is particularly advantageous, since the required computing power is thereby reduced. For this step, a pre-alignment of the measurement data can be carried out, i.e. the measurement data can be provisionally aligned to a target geometry of the object. This can be carried out e.g. on the basis of a one-off, rapid reconstruction. Only those regions in which no reliable conclusion about conformity has yet been possible are reconstructed. Alternatively, or in addition, the entire volume or larger regions can be reconstructed with low resolution and only those regions where the low resolution does not allow for a clear conclusion can be reconstructed in full resolution.

A further step 104 is carried out at least before the step 102 is completed. Step 104 can interrupt step 102. Alternatively, step 104 can be carried out at the same time as step 102, i.e. during step 102, before step 102 is completed. At this time, not all of the measurement data of the object to be determined has yet been determined. This means that only part of the digital representation of the object exists. Step 104 in this case includes the steps 106, 108, 110 and 112.

In step 106 at least one part of the digital representation of the object is analyzed to identify defects. This is the part of the digital representation of the object that was previously determined by step 102, since step 102 is not yet completed when step 106 is carried out.

The analysis from step 106 shows whether a defect is present in the analyzed at least one part of the digital representation of the object. If at least one defect has been identified in the analyzed at least one part of the digital representation, the path 107 is followed. Step 108 is then executed.

In step 108 at least one conformity result relating to the analyzed part of the digital representation of the object is determined. The conformity result indicates to what extent the analyzed at least one part of the digital representation with the identified defect or the identified defects fulfils at least one predefined conformity criterion for the object. For example, a conformity criterion can be that the defects in that part of the digital representation of the object must have a size within a tolerance interval. Alternatively or additionally, the conformity criterion may require, for example, that only pores of a predefined number with a predefined size are allowed to be present in that part of the digital representation. Additional conformity criteria are possible. For example, the conformity result may indicate that the defects affect the part being analyzed only to a minor extent, thus fulfilling all conformity criteria for the part being analyzed. Alternatively, the conformity result may indicate that the defects strongly affect the part being analyzed so that at least one conformity criterion for the part being analyzed is not fulfilled. In a further alternative the conformity criterion can indicate that further measurement data is needed in order to determine whether the at least one part of the digital representation of the object being analyzed fulfils the at least one conformity criterion.

Step 108 can comprise a plurality of optional sub-steps.

In an optional sub-step 122, it can be determined whether a global quality requirement for the measurement data of the at least one part of the digital representation of the object is fulfilled. The global quality requirement for the entire digital representation of the object is in this case derived from an evaluation rule. The evaluation rule can be predefined or created retrospectively. The evaluation rule can specify, for example, minimum requirements for the noise and the point spreading function. On the one hand, it can be concluded that no problematic effects can be overlooked if this minimum requirement is fulfilled. Furthermore, uncertainty of the measurement data can be linked to the quality requirements. For example, the uncertainty of the measurement data is considered small or negligible in relation to the required tolerance if the quality requirements are fulfilled.

In a further optional sub-step 124 following sub-step 122, if the global quality requirement is not fulfilled, at least one conformity result can be provided indicating that it is uncertain whether the at least one part of the digital representation fulfils the predefined conformity criterion.

Alternatively or additionally, step 108 can comprise the optional sub-steps 126, and 128.

In sub-step 126, it is determined whether a local quality requirement for the measurement data of the at least one part of the digital representation of the object is fulfilled. The local quality requirement is derived from an evaluation rule for one region of the digital representation of the object. This means that the local quality requirement applies only to this region of the digital representation. Other regions of the digital representation are subject to a different local quality requirement. In contrast, a global quality requirement applies to all regions of the digital representation, i.e. to the entire digital representation of the object.

As a local quality requirement, the evaluation rule can specify, for example, local minimum requirements for the noise and the point spreading function. The local quality requirements may depend on the analyses to be performed locally. For example, the uncertainty of the measurement data is considered small or negligible in relation to the required tolerance if the minimum requirements are fulfilled. The uncertainty applies locally in the region of the digital representation. The uncertainty can be estimated with the aid of the local noise and the available two- or three-dimensional image data of the individual regions and the already identified defects or their surroundings.

If the local quality requirement is not met, in sub-step 128 a conformity result is provided, which indicates that it is uncertain whether the at least one part of the digital representation of the object fulfils the predefined conformity criterion. This means that the conformity result indicates neither that the conformity criteria have been fulfilled nor that they have not been fulfilled. Instead, the conformity result indicates an intermediate state that requires additional measurement data about the object to be determined.

Further, step 108 can alternatively or additionally have the optional sub-steps 130 and 132.

In sub-step 130, a point spreading function is determined from the measurement data and provided. Using the point spreading function, in sub-step 132 it is estimated to what extent a defect that does not fulfil the predefined conformity criterion for the object can be identified. This is carried out taking into account the quality of the measurement data. The estimation results in a confidence value.

If no defect is identified in the analyzed at least one part of the digital representation of the object and at the same time sufficient measurement data have been acquired in step 102 to establish that the analyzed at least one part of the digital representation of the object fulfils the at least one conformity criterion, the path 109 is followed. Step 110 is then executed.

In step 110, a conformity result is generated, which indicates that the at least one analyzed part of the digital representation of the object fulfils the at least one predefined conformity criterion for the object.

In step 112, step 102 is adapted according to the conformity result. That is, if the conformity result indicates that the identified defects affect the at least one part of the digital representation of the object to such an extent that it does not fulfil the at least one conformity criterion, the object is treated as scrap and in step 112, step 102 is adapted according to the conformity result. Further determination of measurement data from other parts of the object will no longer change the conformity result in this case.

If the conformity result indicates that the identified defects affect the at least one part of the digital representation of the object to such an extent that it fulfils the at least one conformity criterion, further determination of measurement data from other parts of the object will also no longer affect the conformity result. The object can be treated as a fully compliant object.

In both cases, step 102 can be terminated according to sub-step 114 of step 112. This means that the determination of the measurement data is terminated as soon as the conformity result determines that the conformity criterion cannot be fulfilled with the part of the object measured so far, or that the conformity criterion is met in any case with the part of the object measured so far. Further measurement of the object would no longer change the conformity result, and is therefore unnecessary. The time used for this additional measurement can thus be saved.

In the event that the conformity result indicates that it is not certain whether the conformity criterion is fulfilled or not, the determination of the measurement data is continued in accordance with step 102.

The sub-step 114 may comprise the sub-substep 118, in which at least one uncertainty of step 106 is taken into account to terminate the step 102. This means that step 114 is only carried out if the conformity result indicates a certain result, i.e. either a fulfilment of the at least one conformity criterion, or a non-fulfilment of the conformity criterion, even taking into account the uncertainty. The uncertainty of the measurement result or conformity result must therefore also be within the range in which the conformity criterion is fulfilled or not fulfilled. If due to the uncertainty the conformity result indicates a possible fulfilment and a possible non-fulfilment of the conformity criterion, step 114 will not be carried out.

Optionally, if the sub-substep 118 is provided, the sub-step 120 can be provided in step 108. In sub-step 120, at least one local uncertainty is determined, which arises in step 106 during the analysis of the at least one part of the digital representation of the object for identifying defects. The local uncertainty only affects the part of the digital representation of the object that is examined in the analyzing step.

The local uncertainty can be estimated by taking into account local noise in the measurement data and/or local image information in a surrounding region, and other existing known defects.

Alternatively or additionally, step 102 can be carried out by means of a radiographic measurement of the object, so that the measurement data are radiographic images of the object. In this case, radiation is transported through the object by means of the device for measuring the object, wherein the device for measuring the object and the object define a radiographic geometry. Step 112, for example, can then provide the sub-steps 134 and 136.

In sub-step 134 at least one region in the at least one part of the digital representation of the object is identified in which an uncertain conformity result is indicated. This means that it is not possible to determine for this region whether the at least one predefined conformity criterion is fulfilled or not. For example, this can be caused by uncertainty in the conformity result, wherein without the uncertainty the conformity result would indicate that the predefined conformity criterion certainly was fulfilled or not fulfilled, but due to the uncertainty of the conformity result the opposite result could also be fulfilled.

In sub-step 136, a radiographic geometry of the radiographic measurement of the object is modified in such a way that further measurement data for the region identified in step 134 is determined. This means that the radiographic geometry for this region is adapted such that further measurement data, recorded with the device for measuring the object, in combination with the previously determined measurement data will probably allow a conclusion as to the conformity of the object.

The sub-step 136 may further comprise the sub-substep 140, in which the radiographic geometry of the radiographic measurement of the object is modified, thus avoiding the possibility of irradiating regions of the object for which no conclusion as to the conformity result is possible and strongly absorbent regions simultaneously, or of the strongly absorbing regions of the object obscuring the regions in which it has been determined that no conclusion can be drawn about conformity in the radiographic scanning. The strongly absorbing regions may be predefined or previously determined from the measurement data. The quality of the measurement data can be significantly improved by avoiding simultaneous irradiation. Furthermore, this prevents the regions that are left out and strongly absorbing regions of the object from generating measurement data that also cannot be used to determine whether the at least one conformity criterion is fulfilled or not. Therefore, this can save measurement time, making the computer-implemented method 100 more efficient.

Alternatively or additionally, step 112 may also comprise the sub-step 138. In sub-step 138, at least one setting option of a device for carrying out step 102 is changed. This step is performed taking into account the modified radiographic geometry from sub-step 136.

Alternatively or additionally, step 112 may also comprise the sub-steps 142 and 144.

In sub-step 142 at least one region is identified in the at least one part of the digital representation of the object, in which the at least one conformity result is uncertain. This means that regions are identified in which further measurement data must be collected, as it is not clear whether the conformity criterion is fulfilled or not.

In sub-step 144, measurement data is then determined with further measurements. These further measurements differ from the radiographic measurement. This means that if the radiographic measurement was carried out, for example, by means of computer tomography, the further measurements are carried out with ultrasound, for example. Further measurement data are determined for the region identified in sub-step 142. The further measurement data are intended to help ensure that a reliable conformity result can be determined for the identified region.

The occurrence of artifacts such as strip artifacts and/or metal artifacts, for example, can be predicted using the computer-implemented method 100, if applicable depending on the radiographic geometry. Thus, a radiographic geometry can be selected for determining the measurement data for which these artifacts are least likely to be present in regions where an analysis is to be performed.

The computer-implemented method 100 can be executed by means of a computer program product on a computer. The computer program product has instructions that can be executed on a computer. When these instructions are executed on a computer, they cause the computer to carry out the method.

The invention is not restricted to one of the embodiments described above, but rather may be modified in a variety of ways. All the features and advantages that emerge from the description and from the drawing, including structural details, spatial arrangements and method steps, may be essential to the invention both individually and in a wide variety of combinations.

The invention claimed is:

1. A computer-implemented method for measuring an object, wherein the method comprises the following steps:

defining a complete set of planned projections for a measurement;

determining measurement data by means of a device for measuring the object, including acquiring a first subset of projections from the set, wherein the measurement data generates a digital representation of the object with a plurality of image data of the object;

carrying out the following steps, during the step of determining measurement data, and before the step of determining measurement data has ended:

analyzing at least one part of the digital representation of the object to identify defects;

if at least one defect is identified in the analyzed at least one part of the digital representation: determining at least one conformity result relating to the analyzed part of the digital representation of the object, the conformity result indicating to what extent the analyzed at least one part of the digital representation with the identified at least one defect fulfils at least one predefined conformity criterion for the object; and if no defect is identified in the analyzed at least one part of the digital representation and sufficient measurement data have been acquired to establish that the analyzed at least one part of the digital representation of the object fulfils the at least one conformity criterion: generating a conformity result relating to the at least one analyzed part of the digital representation of the object, the conformity result indicating to what extent the at least one predefined conformity criterion for the object is fulfilled; and adapting the step of determining measurement data via a closed-loop control, wherein the acquisition of the remaining projections of the planned set is terminated if the conformity result indicates that the object fulfils or fails to fulfil a predefined conformity criterion.

2. The method as claimed in claim 1, wherein the step of adapting the step of determining measurement data taking the conformity result into account comprises the following sub-step:

terminating the step of determining measurement data when sufficient measurement data have been acquired in order to determine that the analyzed at least one part of the digital representation of the object fulfils the at least one conformity criterion.

3. The method as claimed in claim 2, wherein the sub-step of terminating the step of determining measurement data has the following sub-substep:

taking into account at least one uncertainty of the step of analyzing at least one part of the digital representation of the object for identifying defects.

4. The method as claimed in claim 3, wherein the step of determining a conformity result comprises the following additional sub-step:

determining at least one local uncertainty of the step of analyzing at least one part of the digital representation of the object for identifying defects for one part of the digital representation of the object that comprises the analyzed at least one defect, the local uncertainty being estimated by means of a local noise of the measurement data and/or the local image information in a surrounding region around already known further defects.

5. The method as claimed in claim 1, wherein the step of determining at least one conformity result relating to the at least one analyzed part of the digital representation of the object comprises the following sub-steps:

determining whether a global quality requirement for the measurement data of the at least one part of the digital representation of the object is fulfilled, wherein the global quality requirement for the entire digital representation of the object is derived from an evaluation rule, and if the global quality requirement is not fulfilled: providing at least one conformity result indicating that it is uncertain whether the at least one part of the digital representation fulfils the predefined conformity criterion.

6. The method as claimed in claim 1, wherein the step of determining at least one conformity result relating to the at least one analyzed part of the digital representation of the object comprises the following sub-steps:

determining whether a local quality requirement for the measurement data of the at least one part of the digital representation of the object is fulfilled, wherein the at least one local quality requirement for one region of the digital representation of the object is derived from an evaluation rule, and if the local quality requirement is not fulfilled: providing at least one conformity result indicating that it is uncertain whether the at least one part of the digital representation fulfils the predefined conformity criterion.

7. The method as claimed in claim 1, wherein the step of determining at least one conformity result comprises the following further sub-steps:

providing a point spreading function derived from the measurement data; and estimating a confidence value to indicate to what extent a defect that does not fulfil the predefined conformity criterion for the object can be identified, taking into account the quality of the measurement data.

8. The method as claimed in claim 1, wherein in the step of determining measurement data by means of a device for measuring the object, a radiographic measurement of the object is carried out, wherein the step of adapting the step of determining measurement data taking the conformity result into account has the following sub-steps:

identifying at least one region in the at least one part of the digital representation of the object, in which the at least one conformity result indicates that it is uncertain whether the at least one predefined conformity criterion is fulfilled or not; and modifying a radiographic geometry of the radiographic measurement of the object in the step of determining measurement data, in such a way that further measurement data is determined for the identified region.

9. The method as claimed in claim 8, wherein the step of adapting the step of determining measurement data taking the conformity result into account further comprises the following sub-step:

changing at least one setting option of a device for carrying out the step of determining measurement data, taking the modified radiographic geometry into account.

10. The method as claimed in claim 9, wherein the sub-step of modifying a radiographic geometry of the radiographic measurement of the object in the step of determining measurement data has the following sub-substep:

modifying the radiographic geometry of the radiographic measurement of the object, avoiding simultaneous radiographic measurement of predefined and/or strongly absorbing regions of the object and of the identified regions of the object identified from the measurement data, in which the conformity result indicates that no conclusion can be drawn as to whether the analyzed at least one part of the digital representation of the object with the identified defect fulfils or does not fulfil the at least one predefined conformity criterion.

11. The method as claimed in claim 1, wherein the step of adapting the step of determining-measurement data taking the conformity result into account comprises the following sub-steps:

identifying at least one region in the at least one part of the digital representation of the object, in which the at least one conformity result indicates that it is uncertain whether the at least one predefined conformity criterion is fulfilled or not; and determining measurement data of a further measurement, which differs from the radiographic measurement, from the identified region in such a way that further measurement data is determined for the identified region.

12. The method as claimed in claim 1, wherein the following steps are carried out while the step of determining measurement data is carried out: analyzing at least one part of the digital representation of the object to identify defects; if at least one defect is identified in the analyzed at least one part of the digital representation:

determining at least one conformity result relating to the at least one analyzed part of the digital representation of the object, the conformity result indicating to what extent the analyzed at least one part of the digital representation with the identified at least one defect fulfils at least one predefined conformity criterion for the object; and if no defect is identified in the analyzed part of the digital representation and sufficient measurement data have been acquired to determine that the analyzed at least one part of the digital representation of the object fulfils the at least one conformity criterion: generating a conformity result relating to the at least one analyzed part of the digital representation of the object, the conformity result indicating that the at least one predefined conformity criterion is fulfilled for the object; adapting the step of determining measurement data taking the at least one conformity result into account.

13. The method as claimed in claim 1, wherein the step of determining measurement data further comprises the following step:

generating a digital representation of the object only for those parts of the object in which the at least one predefined conformity criterion is defined.

14. A non-transitory computer program product that contains instructions that can be executed on a computer, which when executed on a computer cause the computer to carry out the method as claimed in claim 1.

* * * * *